United States Patent
Calhoun et al.

(10) Patent No.: US 11,588,307 B1
(45) Date of Patent: Feb. 21, 2023

(54) PULLING GRIP ASSEMBLY

(71) Applicant: Southwire Company, LLC, Carrollton, GA (US)

(72) Inventors: Franklin Clarence Calhoun, Carrollton, GA (US); Myron Dale Deese, Carrollton, GA (US); Juan Alberto Galindo Gonzalez, Powder Springs, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 17/346,577

(22) Filed: Jun. 14, 2021

Related U.S. Application Data

(62) Division of application No. 15/625,341, filed on Jun. 16, 2017, now Pat. No. 11,038,323.

(60) Provisional application No. 62/351,686, filed on Jun. 17, 2016.

(51) Int. Cl.
*H02G 1/08* (2006.01)

(52) U.S. Cl.
CPC ............ *H02G 1/083* (2013.01); *H02G 1/081* (2013.01); *H02G 1/08* (2013.01)

(58) Field of Classification Search
CPC ........... H02G 1/08; H02G 1/081; H02G 1/083
USPC ................. 254/134.3 CL, 134.3 FT, 134.3 R
See application file for complete search history.

(56) References Cited

U.S. PATENT DOCUMENTS

| | | | |
|---|---|---|---|
| 1,011,324 | A | 12/1911 | Darling |
| 5,938,212 | A | 8/1999 | Wadsworth |
| 9,027,908 | B1 | 5/2015 | Calhoun |
| 10,027,097 | B1 | 7/2018 | Jordan |
| 2004/0041136 | A1 | 3/2004 | Ames |
| 2014/0241812 | A1 | 8/2014 | Herrick |
| 2017/2919123 | | 8/2017 | Ziola |

OTHER PUBLICATIONS

Atlantis Fitness, "1/2-13 x 1.75" Long Hollow Bolt—Top Plate Threaded Cable Retainer, retrieved at http://www.exercise-equipment-parts.com/hollowbolt.html?gclid= CN7O26DYi8wCFZSEaQodi44BHQ on Apr. 14, 2016.
U.S. Office Action dated May 1, 2019 in U.S. Appl. No. 15/625,341.
U.S. Office Action dated Dec. 13, 2019 in U.S. Appl. No. 15/625,341.
U.S. Office Action dated Oct. 7, 2020 in U.S. Appl. No. 15/625,341.
U.S. Notice of Allowance dated Feb. 4, 2021 in U.S. Appl. No. 15/625,341.

*Primary Examiner* — Lee D Wilson
*Assistant Examiner* — Aaron R McConnell
(74) *Attorney, Agent, or Firm* — Hartman & Citrin LLC

(57) ABSTRACT

A pulling grip assembly and methods, systems, and apparatuses for constructing the pulling grip assembly are disclosed. The pulling grip assembly can include a pulling grip. The pulling grip can include an elongated body portion and a lug portion. The lug portion can include a blind hole for receiving an assembly including a hollow fastening member and a pulling cable retained within the hollow fastening member.

12 Claims, 8 Drawing Sheets

PULLING GRIP ASSEMBLY

CROSS-REFERENCE TO RELATED APPLICATIONS

This application is a division of and claims priority to U.S. patent application Ser. No. 15/625,341, entitled "Pulling Grip Assembly," filed Jun. 16, 2017, now U.S. Pat. No. 11,038,323, which is incorporated herein by reference in its entirety and which claims priority to U.S. Provisional Application No. 62/351,686, entitled "Pulling Grip Assembly," filed Jun. 17, 2016, which is incorporated herein by reference in its entirety.

BACKGROUND

Multiple conductor cabling consisting of multiple, independent wires or conductors are an integral part of many systems, including electrical and power systems. Such cabling may be installed by pulling the independent conductors in parallel through pipe or conduit over long distances. A pulling rope running through the conduit is attached to each conductor, and the pulling rope is pulled through the conduit, drawing the multiple conductor cabling from spools or other delivery mechanisms and through the conduit. The amount of force required to pull several conductors through a lengthy conduit, potentially with many bends or turns, may be substantial, and if the force is applied to the cabling improperly, one or more conductors may be damaged during the pull. Such damage may hamper performance of the multiple conductor cabling or present safety issues. In addition, finding and repairing the damaged portions of the conductors may be prohibitively expensive or physically impossible, and may necessitate replacement of the entire cabling.

The conductors may be attached to the pulling rope through a pulling grip assembly. The pulling grip assembly may include a pulling grip attached to each conductor and a pulling cable or lanyard that attaches each pulling grip to the pulling rope. Typically, the pulling grip has a first end and a second end and defines an interior cylindrical cavity into which a conductor may be inserted, via the first end, for attaching the pulling grip to the conductor. The second end of the pulling grip may define an aperture that the pulling cable or lanyard can be passed through for attachment to the pulling grip. Based on this construction, any moisture or debris that the pulling grip encounters can gain access to the interior cylindrical cavity of the pulling grip, via the aperture of the pulling grip, and ultimately the conductor on which the pulling grip is attached, causing damage and capacitive alterations to the conductor.

SUMMARY

The present disclosure is directed to a pulling grip assembly and methods, systems, and apparatuses for constructing the pulling grip assembly. According to various embodiments of the concepts and technologies described herein, the pulling grip assembly can include a pulling grip. The pulling grip can include an elongated body portion and a lug portion. The lug portion can comprise a blind hole for receiving an assembly. The pulling grip assembly can further include the assembly. The assembly can include a hollow fastening member and a pulling cable retained within the hollow fastening member.

The present disclosure is further directed to a method for constructing a pulling grip assembly. According to various embodiments, a pulling cable is retained within a hollow fastening member to form an assembly of the pulling cable and the hollow fastening member. The assembly of the pulling cable and the hollow fastening member can be secured within a blind hole of a lug portion of a pulling grip.

This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to a pulling grip assembly and methods, systems, and apparatuses for constructing the pulling grip assembly. This description provides various components, one or more of which may be included in particular implementations of the pulling grip assembly and the methods, systems, and apparatuses for constructing the pulling grip assembly. In illustrating and describing these various components, however, it is noted that implementations of the pulling grip assembly and the methods, systems, and apparatuses for constructing the pulling grip assembly may include any combination of these components, including combinations other than those shown in this description.

Figure 1:
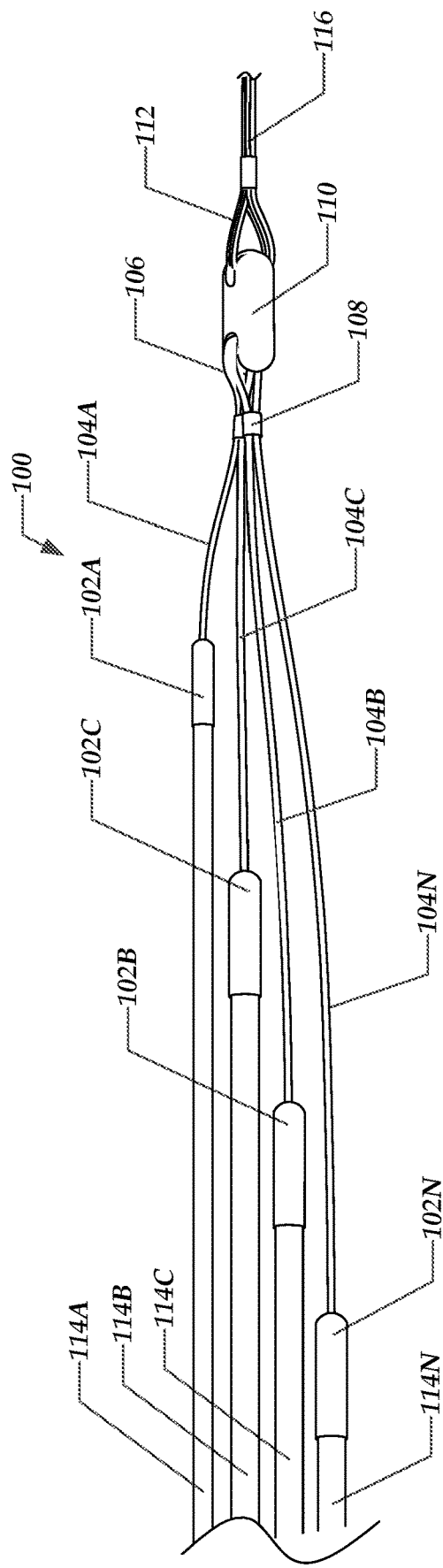
FIG. 1 illustrates a plurality of pulling grip assemblies attached to a plurality of corresponding conductors, a clevis, and a pulling rope, according to an illustrative embodiment.

FIG. 1 illustrates a plurality of pulling grip assemblies, denoted generally at 100, attached to a plurality of corresponding insulated conductors 114A-114N, a clevis 110, and a pulling rope 116. Respective pulling grips 102A-102N (collectively, pulling grips 102 or used singularly as pulling grip 102) of the pulling grip assemblies 100 are shown affixed to the corresponding insulated conductors 114A-114N (collectively, insulated conductors 114 or used singularly as insulated conductor 114). In overview, the pulling grips 102 serve to attach the insulated conductors 114 to respective pulling cables or lanyards 104A-104N (collectively, pulling cables 104 or used singularly as pulling cable 104) of the pulling grip assemblies 100. The pulling cables 104 may be constructed of any suitable metallic or nonmetallic material, and may be coated or impregnated with friction-reducing compounds. Without limiting possible implementations, the pulling cables 104 may also represent pulling ropes, pulling members, strength members, or the like.

The individual pulling cables 104 may include loops, referenced collectively at 106, which may be formed by suitable crimps, swages, or other attachment means (denoted collectively at 108). In turn, any number of the pulling cables 104 may be connected to the clevis 110. The clevis 110 may facilitate attachment of the pulling cables 104 to the pulling rope 116. The pulling rope 116 may include a loop 112 facilitating attachment of the pulling rope 116 to the clevis 110. The clevis 110 may be constructed of any suitable metallic or nonmetallic materials, chosen as appropriate for the loads anticipated to be borne by the clevis 110 during pulls of the completed pulling grip assembly through conduit. In addition, implementations of the clevis 110 may be dimensioned and shaped differently from the examples shown in FIG. 1, without departing from the scope and spirit of the present description. The clevis 110 may be characterized as a "swivel" or "swiveling" clevis. For example, during a given pull, the pulling cables 104 and/or the pulling rope 116 may twist axially, experiencing forces as the pull proceeds. However, in implementations where the clevis 110 is a swiveling clevis, the swiveling clevis may serve to isolate the pulling cables 104 and the pulling rope 116 from each other, allowing, for example, the pulling cables 104 to twist axially relative to the pulling rope 116, without also exposing the pulling rope 116 to those same twisting forces.

In different possible implementations, a given pulling cable 104 may be attached to one or two of the pulling grips 102. For example, the pulling cables 104B and 104N may be the same pulling cable, with one end attached to the pulling grip 102B and the other end attached to the pulling grip 102N. This may reduce the number of loops 106 passing through the clevis 110, by attaching two pulling grips 102 to a given pulling cable 104. Finally, the clevis 110 may be attached to the loop 112 formed by the pulling rope 116.

Figure 2:
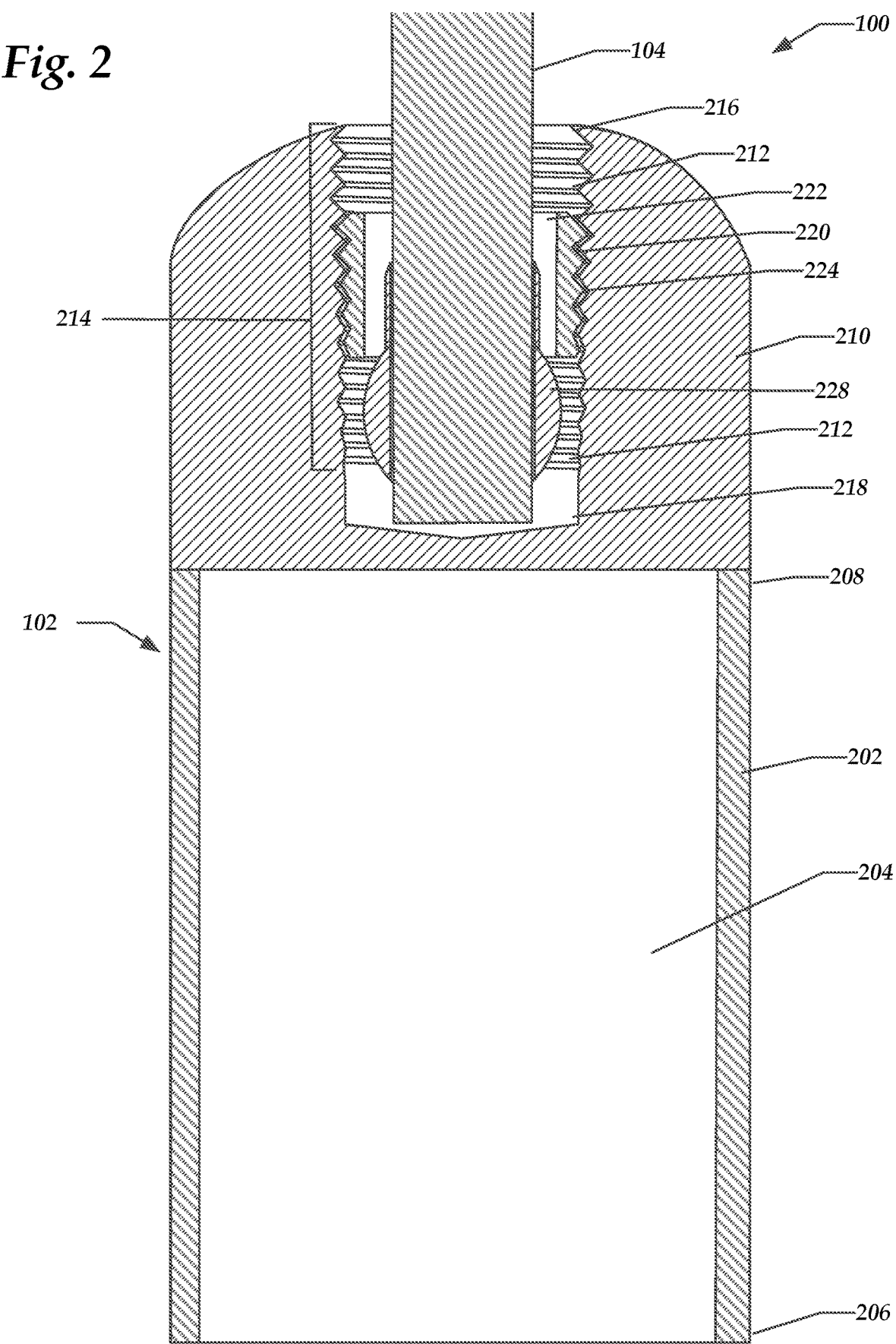
FIG. 2 illustrates a cross-sectional view of a pulling grip assembly 100, according to a first illustrative embodiment.

Turning now to FIG. 2, the pulling grip assembly 100 will be described in detail in accordance with a first illustrative embodiment. According to embodiments, the pulling grip assembly 100 includes a pulling grip, such as the pulling grip 102, a hollow fastening member 220, and a pulling cable, such as the pulling cable 104. The pulling grip 102 may generally include a somewhat elongated body portion 202, which defines an interior cavity 204 along at least part of the elongated body portion 202. According to exemplary embodiments, the elongated body portion 202 includes a first end 206 and a second end 208. A conductor 114, or the bare cable or wire of the conductor 114 that is exposed when a portion of insulation of the conductor 114 is stripped away, may be inserted into the interior cavity 204, via the first end 206 of the elongated body portion 202, and the elongated body portion 202 may be crimped, swaged, or otherwise secured to the bare cable or wire. Crimps may be applied to the elongated body portion 202 so that adjacent crimps have differing rotational alignments relative to one another, which may promote a more secure overall attachment between the pulling grip 102 and the bare cable or wire of the conductor 114. Alternatively, the crimps may be applied to the elongated body portion 202 so that adjacent crimps have approximately the same rotational alignment relative to one another. In other implementation scenarios, the pulling grip 102 may include a wedging mechanism, set screws, or other mechanical mechanisms operative to secure the elongated body portion 202 to the exposed cable or wire of the conductor 114.

According to exemplary embodiments, the pulling grip 102 also includes a lug portion 210 extending from the second end 208 of the elongated body portion 202. Both the elongated body portion 202 and the lug portion 210 of the pulling grip 102 may be manufactured of a material such as aluminum or an alloy thereof. The pulling grip 102 may be manufactured using any suitable processes, including but not limited to, machining from a single piece of stock aluminum or other material, as well as forging, casting, molding, or the like. The lug portion 210 and the elongated body portion 202 may be integral with one another forming a unitary structure by virtue of being machined from a single piece of stock aluminum or other material. Alternatively, the lug portion 210 and the elongated body portion 202 may be machined as separate pieces that are attached to one another via an adhesive, welding, or other mechanical connection. According to embodiments, the lug portion 210 may have a female threaded portion (not shown) that engages a male threaded portion (not shown) of the elongated body portion 202, or vice versa, to allow the lug portion 210 to be removably attached to the elongated body portion 202 so that the lug portion 210 can be removed and reused on another elongated body portion.

As illustrated in FIG. 2, the lug portion 210 of the pulling grip 102 may include a threaded blind hole 212 that extends a specified depth through a portion of the lug portion 210 without breaking through to the interior cavity 204 of the elongated body portion 202 of the pulling grip 102 such that the threaded blind hole 212 remains sealed off from the interior cavity 204 of the elongated body portion 202 of the pulling grip 102. The threaded blind hole 212 may be created in the lug portion 210 using a progressive tap, such as a pipe tap, that cuts internal threads that progressively get more shallow in depth as they proceed down a hole as illustrated by the internal threads, denoted generally at 214, of the threaded blind hole 212 in FIG. 2, which progressively get more shallow in depth as the internal threads 214 proceed from a first end 216 of the threaded blind hole 212 to a second end 218 of the threaded blind hole 212. In particular, the internal threads 214 cut at and near the first end 216 of the threaded blind hole 212 extend further into the lug portion 210 than the internal threads 214 cut near the second end 218 of the threaded blind hole 212.

Figure 3A:
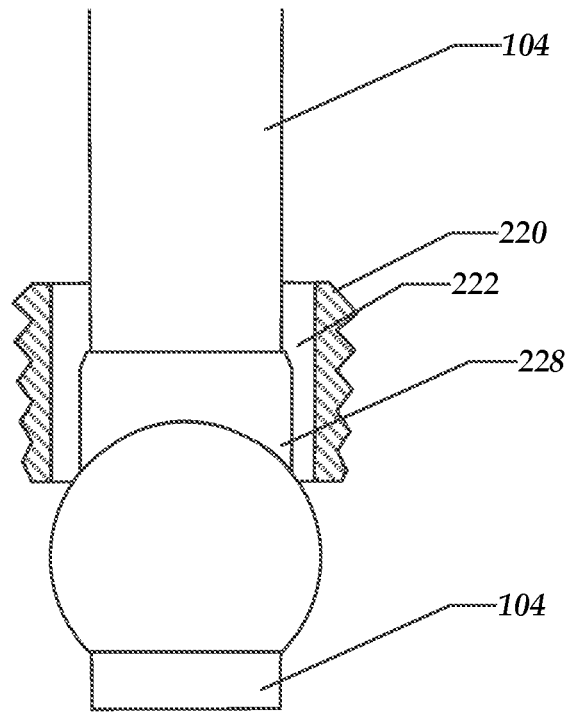
FIGS. 3A-3B illustrate an assembly of the hollow fastening member and the pulling cable with a cross sectional view of the hollow fastening member and a front view of the pulling cable and the stop in FIG. 3A, and an assembly of the hollow fastening member and the pulling cable with a cross sectional view of the hollow fastening member as well as a cross sectional view of the pulling cable and the stop in FIG. 3B, all according to the first illustrative embodiment.
Figure 3B:
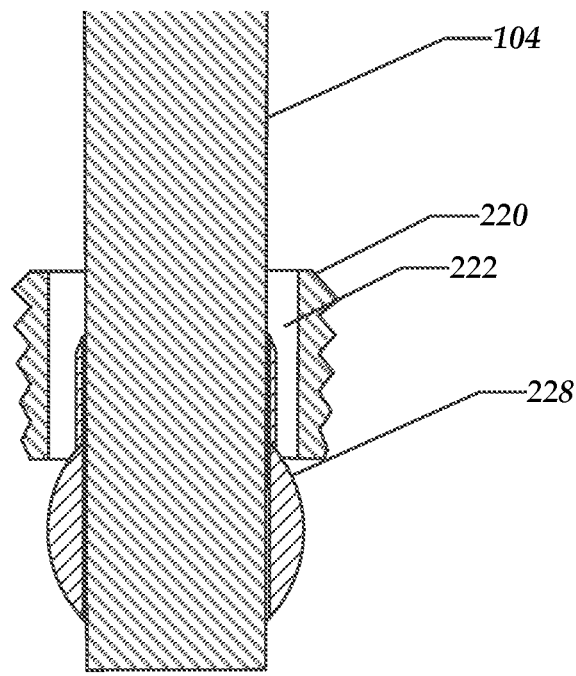

The progressively more shallow depth of the internal threads 214 of the threaded blind hole 212 work to lock the hollow fastening member 220 into the threaded blind hole 212. According to exemplary embodiments, the hollow fastening member 220 is a threaded insert defining an opening 222, as illustrated by FIGS. 2 and 3A-3B, for receiving a pulling cable, such as the pulling cable 104, as discussed further below. The hollow fastening member 220 includes external threads 224 that mate with the internal threads 214 of the threaded blind hole 212, when the hollow fastening member 220 is screwed into the threaded blind hole 212. As the hollow fastening member 220 is screwed further into the threaded blind hole 212, at least a portion of the external threads 224 of the hollow fastening member 220 contact the more shallow threads at the second end 218 of the threaded blind hole 212, causing a wedging action that creates a self-engaging bind as the hollow fastening member 220 encounters resistance and locks the hollow fastening member 220 within the threaded blind hole 212. Alternatively, the hollow fastening member 220 may include an adhesive on the external threads 224 which locks the hollow fastening member 220 within the threaded blind hole 212 as the hollow fastening member 220 is screwed into the threaded blind hole 212. The surface of the opening 222 of the hollow fastening member 220 may be smooth as illustrated in FIG. 2, may include internal threads, or may include a combination of both. As used herein, the term "lock" means fixed in position such that removal or attempts at removal would damage and/or destroy surrounding members. For instance, when the hollow fastening member 220 is screwed into the threaded blind hole 212, the hollow fastening member 220 is locked within the threaded blind hole 212 such that removal or attempts at removal of the hollow fastening member 220 from the threaded blind hole 212 would damage and/or destroy the lug portion 210. According to other embodiments, the hollow fastening member 220 may be screwed into the threaded blind hole 212 in a manner that allows the hollow fastening member 220 to be removed without damaging or destroying the lug portion 210.

Prior to screwing the hollow fastening member 220 into the threaded blind hole 212 of the lug portion 210 of the pulling grip 102, a pulling cable, such as the pulling cable 104, and the hollow fastening member 220 are assembled together. According to embodiments, the pulling cable 104 is first passed through the opening 222 of the hollow fastening member 220. The end of the pulling cable 104 passed through the opening 222 is then inserted into an opening of a stop 228, which is then crimped or otherwise secured to the end of the pulling cable 104 inserted through the opening of the stop 228, as further illustrated in FIGS. 3A and 3B. According to exemplary embodiments, the stop 228 is a shank including a ball-shaped portion that has a diameter larger than the inner diameter of the hollow fastening member 220 such that once the stop 228 is secured to the end of the pulling cable 104 passed through the opening 222 of the hollow fastening member 220 and through the opening of the stop 228, the pulling cable 104 is retained within the hollow fastening member 220. As discussed above, according to embodiments, the hollow fastening member 220 is a threaded insert including external threads 224. The outside diameter of the threaded insert used depends on the diameter of the threaded blind hole 212 tapped in the lug portion 210. According to an exemplary embodiment, a threaded insert having an outside diameter of ⅜ inch and an inside diameter of ¼ inch may be used.

Once the pulling cable 104 is secured within the hollow fastening member 220 by virtue of the stop 228, the hollow fastening member 220 can be screwed and locked into the threaded blind hole 212 of the lug portion 210 to attach the pulling cable 104 to the pulling grip 102, as illustrated in FIG. 2. Although the pulling cable 104 is locked within the threaded blind hole 212 by virtue of being assembled with the hollow fastening member 220 as discussed above and illustrated in FIGS. 3A and 3B, the pulling cable 104 is still able to twist axially within the opening 222 of the hollow fastening member 220 as needed in response to forces experienced while being pulled through a conduit, which alleviates the potential of the conductors 114 on which the pulling grips 102 are attached from getting jammed within the conduit. Since the hollow fastening member 220 is locked within the threaded blind hole 212 of the lug portion 210, any axial twisting of the pulling cable 104 is prevented from unscrewing the hollow fastening member 220 from the threaded blind hole 212.

Figure 4A:
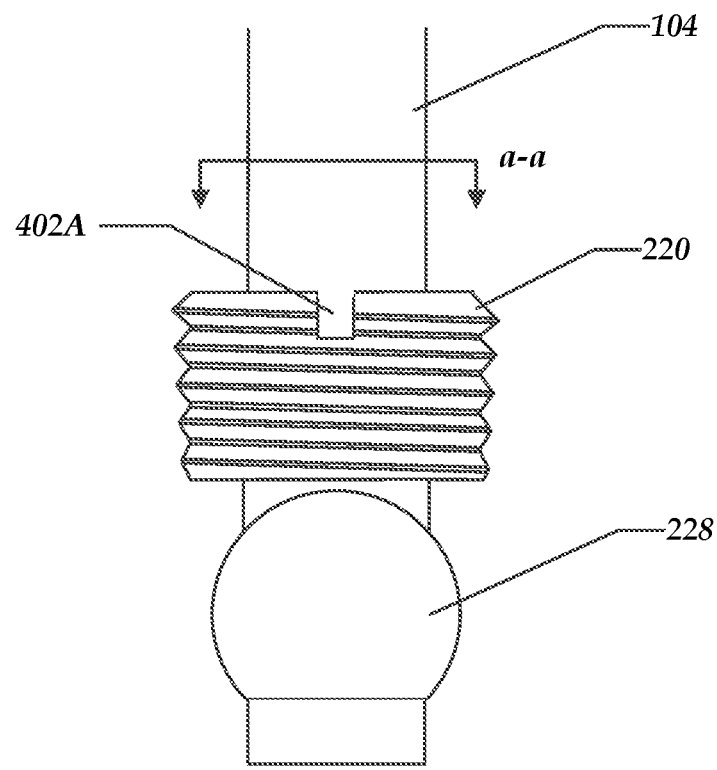
FIG. 4A illustrates a full view of the assembly of the hollow fastening member and the pulling cable, according to the first illustrative embodiment, with a first type of drives.
Figure 4B:
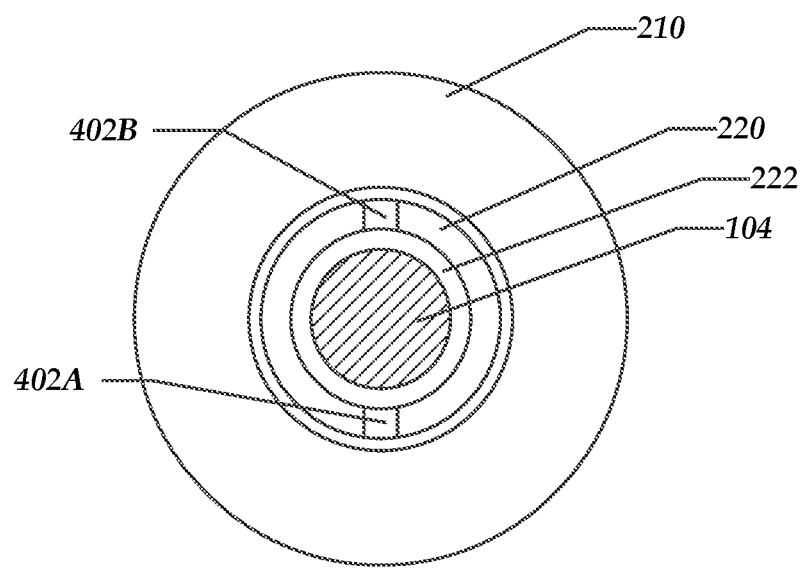
FIG. 4B illustrates a cross section view of the assembly of the hollow fastening member and the pulling cable along line a-a of FIG. 4A, according to the first illustrative embodiment.
Figure 4C:
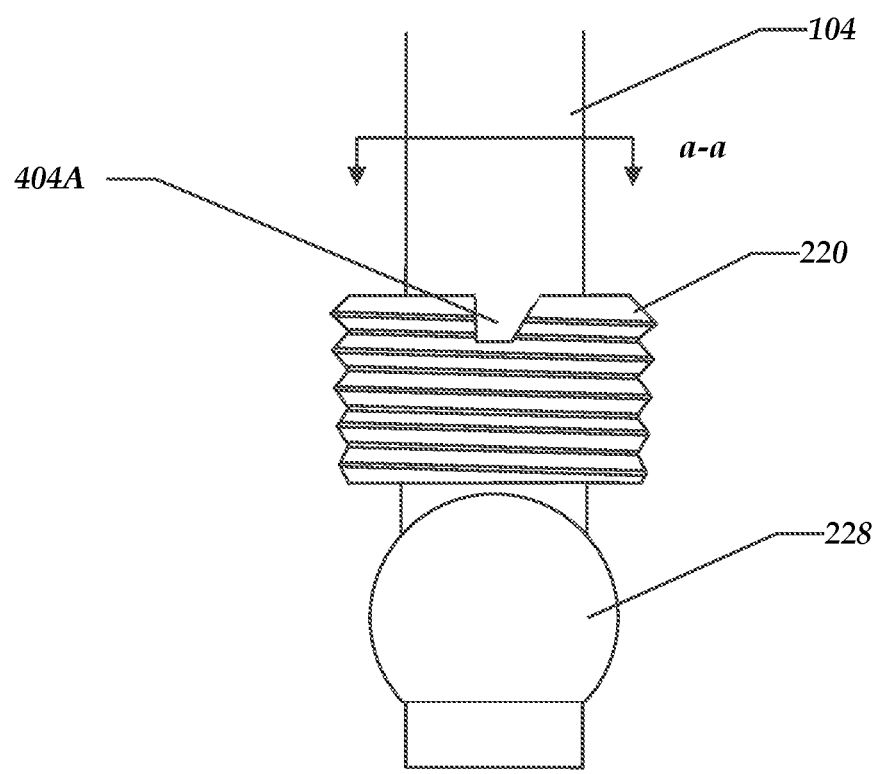
FIG. 4C illustrates a full view of the assembly of the hollow fastening member and the pulling cable, according to the first illustrative embodiment, with a second type of drives.
Figure 4D:
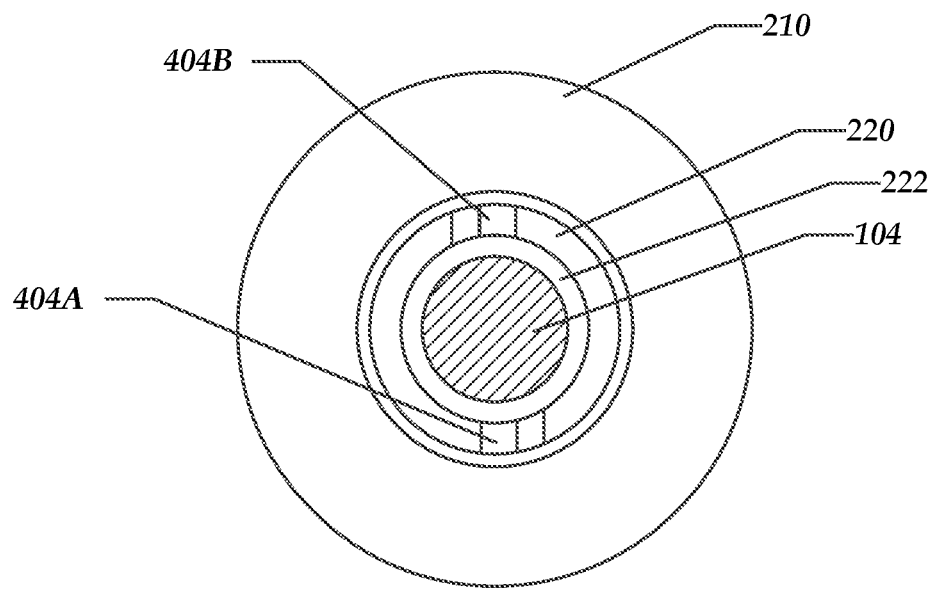
FIG. 4D illustrates a cross section view of the assembly of the hollow fastening member and the pulling cable along line a-a of FIG. 4C, according to the first illustrative embodiment.
Figure 4E:
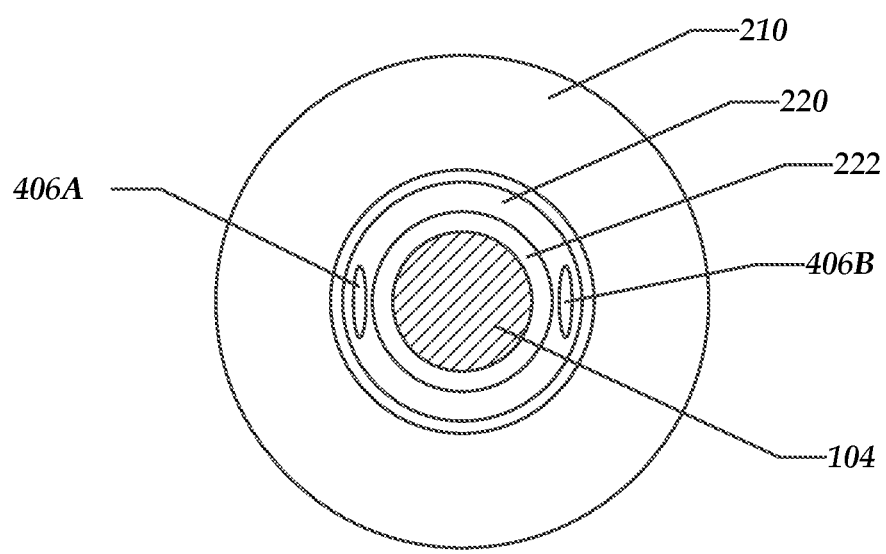
FIG. 4E illustrates a cross section view of the assembly of the hollow fastening member and the pulling cable, according to the first illustrative embodiment, with a third type of drives.

As illustrated in FIGS. 4A and 4B, and according to embodiments, the hollow fastening member 220 includes slot screw drives 402A, 402B for receiving a specialized screwdriver that, when rotated, screws the hollow fastening member 220 into the threaded blind hole 212 of the lug portion 210. Alternatively, as illustrated in FIGS. 4C and 4D, the hollow fastening member 220 includes slanted slot screw drives 404A, 404B for receiving a specialized screwdriver that can be rotated clockwise to engage the hollow fastening member 220 and screw the same into the threaded blind hole 212 of the lug portion 210, but is prevented from engaging the hollow fastening member 220 when rotated counterclockwise by virtue of the slant of the slanted slot screw drives 404A, 404B to further prevent the hollow fastening member 220 from being unscrewed from the threaded blind hole 212 by the specialized screwdriver. According to further embodiments and as illustrated in FIG. 4E, the hollow fastening member 220 may include slot drives 406A, 406B for receiving a specialized tool that, when rotated, screws the hollow fastening member 220 into the threaded blind hole 212 of the lug portion 210. Turning back to FIG. 2, since the threaded blind hole 212 is sealed off from the interior cavity 204 of the elongated body portion 202, any moisture or debris that may collect within the threaded blind hole 212 cannot pass through to the interior cavity 204 of the elongated body portion 202.

Figure 5:
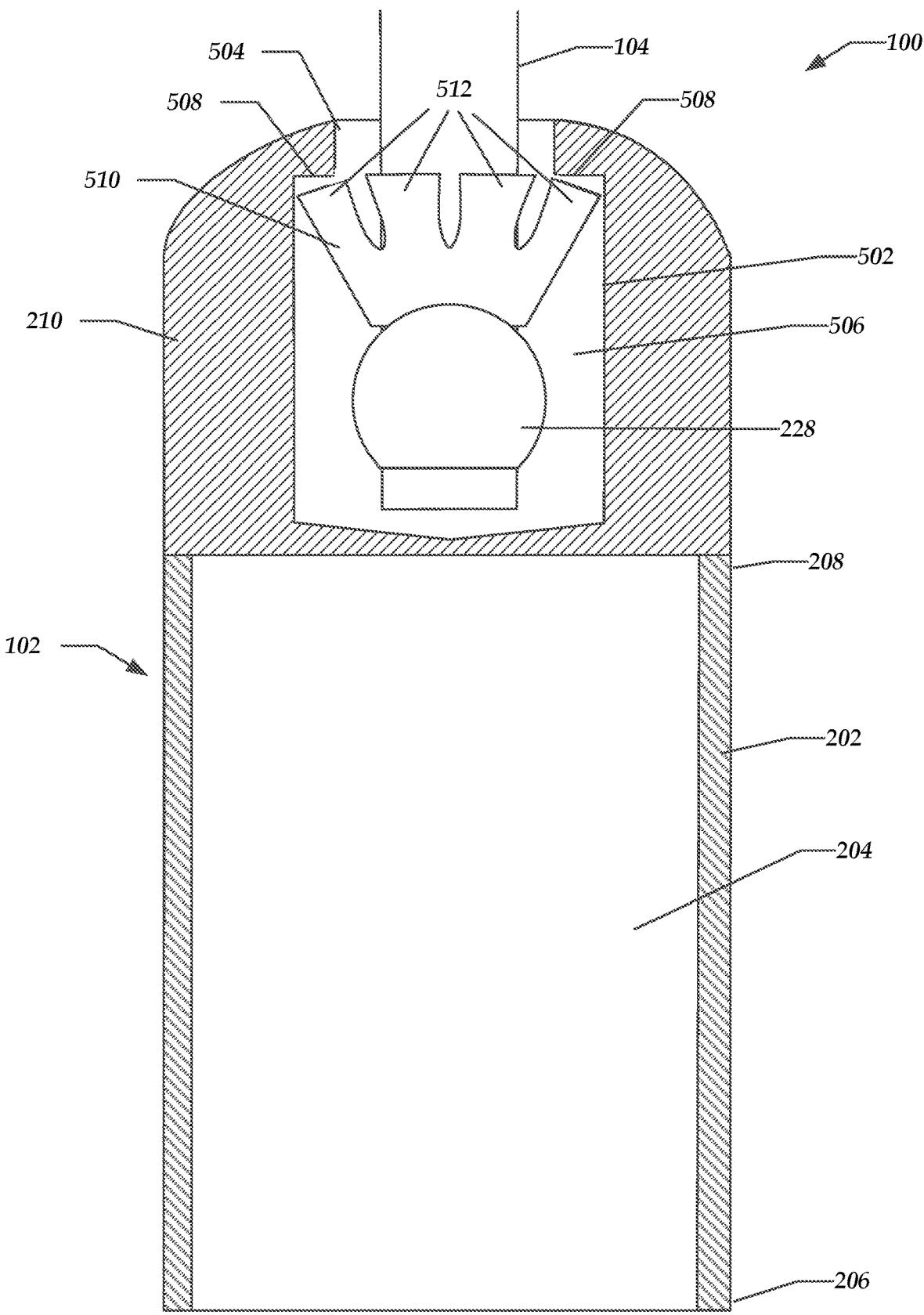
FIG. 5 illustrates a cross-sectional view of a pulling grip assembly 100, according to a second illustrative embodiment.

Turning now to FIG. 5, an alternative illustrative embodiment of the pulling grip assembly 100 is illustrated. According to embodiments, the pulling grip assembly 100 illustrated in FIG. 5 includes a pulling grip, such as the pulling grip 102, a hollow fastening member 510, and a pulling cable, such as the pulling cable 104. The lug portion 210 of the pulling grip 102 illustrated in FIG. 5 includes a blind hole 502 that extends a specified depth through a portion of the lug portion 210 without breaking through to the interior cavity 204 of the elongated body portion 202 of the pulling grip 102 such that the blind hole 502 remains sealed off from the interior cavity 204 of the elongated body portion 202 of the pulling grip 102. According to embodiments, a neck portion 504 of the blind hole 502 has a diameter that is smaller than the diameter of a body portion 506 of the blind hole 502 to create ridges 508 where the neck portion 504 and the body portion 506 connect together. According to some embodiments, the ridges 508 engage the hollow fastening member 510 and lock the hollow fastening member 510 within the blind hole 502 when the hollow fastening member 510 is inserted within the blind hole 502, as discussed further below. Unlike the threaded blind hole 212 illustrated in FIG. 2, the surface of the blind hole 502 illustrated in FIG. 5 may be smooth since the hollow fastening member 510 is locked within the blind hole 502 by the ridges 508 of the blind hole 502.

According to some embodiments, the hollow fastening member 510 includes one or more petals or strips 512 that extend radially from the center of the hollow fastening member 510 and have a resting diameter when the hollow fastening member 510 is in a resting or original state as is illustrated in FIG. 5, and that constrict inwardly towards the center of the hollow fastening member 510 and have one or more constricted diameters when the petals 512 are placed under pressure when the hollow fastening member 510 is in one or more constricted states, such as when the hollow fastening member 510 is inserted within a diameter that is smaller than the resting diameter of the petals 512. According to embodiments, the hollow fastening member 510 is constructed of spring steel or another material with high yield strength that gives the hollow fastening member 510 a spring-like quality and allows the hollow fastening member 510 to deform in response to pressures asserted on the petals 512 and then return to its original shape when the pressures are removed. This spring-like quality allows the hollow fastening member 510 to be inserted and locked into the blind hole 502.

According to some embodiments, as the hollow fastening member 510 is inserted into the neck portion 504 of the blind hole 502, the petals 512 of the hollow fastening member 510 come into contact with the neck portion 504 of the blind hole 502 and are biased inwardly towards the center of the hollow fastening member 510 by virtue of the neck portion 504 having a smaller diameter than the resting diameter of the petals 512 of the hollow fastening member 510. The petals 512 of the hollow fastening member 510 continue to constrict inwardly as the hollow fastening member 510 is pushed further into the blind hole 502 until the constricted diameter of the petals 512 is compressed to a size that is smaller than the diameter of the neck portion 504 of the blind hole 502, at which time the petals 512 are held in the constricted diameter by the neck portion 504 of the blind hole 502, allowing the hollow fastening member 510 to be inserted through the neck portion 504 of the blind hole 502. When the petals 512 of the hollow fastening member 510 move passed the neck portion 504, the petals 512 spring outward from the center of the hollow fastening member 510 and back to the resting diameter since, according to embodiments, the body portion 506 of the blind hole 502 has a diameter that can accommodate the resting diameter of the petals 512 of the hollow fastening member 510. Since the resting diameter of the petals 512 is larger than the diameter of the neck portion 504 of the blind hole 502, the hollow fastening member 510 is maintained within the body portion 506 of the blind hole 502 by the ridges 508 of the blind hole 502, locking the hollow fastening member 510 within the blind hole 502. Alternatively, the hollow fastening member 510 may have a diameter that is sized to fit within the neck portion 504 of the blind hole 502 but may include retractable fins spaced around the diameter that extend outwardly from the hollow fastening member 510 when the hollow fastening member 510 is in a resting or original state and that retract inwardly towards the center of the hollow fastening member 510 when the hollow fastening member 510 is in a constricted state. For instance, as the hollow fastening member 510 moves through the neck portion 504 of the blind hole 502, the retractable fins may retract inwardly towards the center of the hollow fastening member 510, allowing the hollow fastening member 510 to be inserted through the neck portion 504. When the retractable fins move passed the neck portion 504 and enter into the body portion 506 of the blind hole 502, the retractable fins spring back outwardly from the hollow fastening member 510 and lock the hollow fastening member 510 into the body portion 506 of the blind hole 502 by virtue of the ridges 508.

Prior to inserting and locking the hollow fastening member 510 into the blind hole 502 of the lug portion 210 of the pulling grip 102, a pulling cable, such as the pulling cable 104 of the pulling grip assembly 100, and the hollow fastening member 510 are assembled together. According to embodiments, the pulling cable 104 is first passed through an opening of the hollow fastening member 510. The end of the pulling cable 104 passed through the opening of the hollow fastening member 510 is then inserted into an opening of the stop 228, which is then crimped or otherwise secured to the end of the pulling cable 104 inserted through the opening of the stop 228.

Once the pulling cable 104 is secured within the hollow fastening member 510 by virtue of the stop 228, the hollow fastening member 510 can be inserted and locked into the blind hole 502 of the lug portion 210 to attach the pulling cable 104 to the pulling grip 102, as illustrated in FIG. 5 and discussed above. Although the pulling cable 104 is locked within the blind hole 502 by virtue of being assembled with the hollow fastening member 510 as discussed above, the pulling cable 104 is still able to twist axially within the opening of the hollow fastening member 510 as needed in response to forces experienced while being pulled through a conduit, which alleviates the potential of the conductors 114 on which the pulling grips 102 are attached from getting jammed within the conduit.

Figure 6:
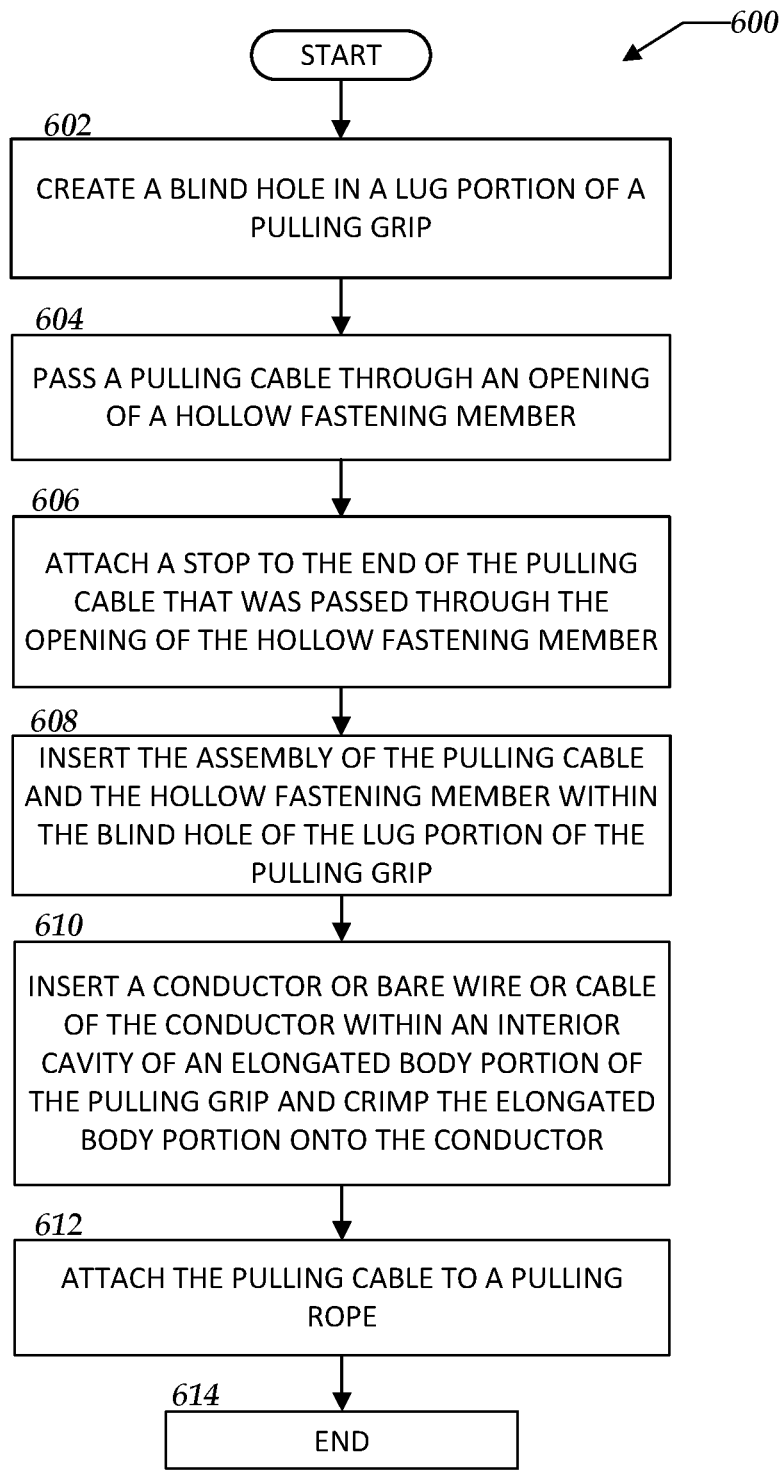
FIG. 6 is a flow diagram illustrating aspects of a method for constructing a pulling grip assembly, according to illustrative embodiments.

Turning now to FIG. 6, aspects of a method 600 for constructing a pulling grip assembly, such as the pulling grip assembly 100, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It also should be understood that the methods disclosed herein can be ended at any time and need not be performed in its entirety.

The method 600 begins at operation 602, where a blind hole, such as the threaded blind hole 212 or the blind hole 502, is created in a lug portion, such as the lug portion 210, of a pulling grip, such as the pulling grip 102. As discussed above, the threaded blind hole 212 may be created using a progressive tap, such as a pipe tap, that cuts internal threads that progressively get more shallow in depth as they proceed down a hole as illustrated by the internal threads 214. The threaded blind hole 212 or the blind hole 502 extends a specified depth through a portion of the lug portion 210 without breaking through to an interior cavity, such as the interior cavity 204, of the elongated body portion 202 of the pulling grip 102 such that the threaded blind hole 212 or the blind hole 502 remains sealed off from the interior cavity 204 of the elongated body portion 202 of the pulling grip 102.

From operation 602, the method 600 proceeds to operation 604, where a pulling cable, such as the pulling cable 104, and a hollow fastening member, such as the hollow fastening member 220 or the hollow fastening member 510, are assembled together by first passing the pulling cable 104 through an opening of the hollow fastening member 220, 510. From operation 604, the method 600 proceeds to operation 606, where a stop, such as the stop 228, is then attached to the end of the pulling cable 104 that was passed through the opening of the hollow fastening member 220, 510. According to embodiments, the stop 228 is crimped or otherwise secured to the end of the pulling cable 104 that was passed through the opening of the hollow fastening member 220, 510. According to exemplary embodiments, the stop 228 is ball-shaped and has a general dimension that is larger than the inner diameter of the hollow fastening member 220, 510 such that once the stop 228 is secured to the end of the pulling cable 104 passed through the opening of the hollow fastening member 220, 510, the pulling cable 104 is retained within the hollow fastening member 220, 510.

From operation 606, the method 600 proceeds to operation 608, where the assembly of the pulling cable 104 and the hollow fastening member 220, 510 is inserted within the blind hole 212, 502 of the lug portion 210 of the pulling grip 102. According to embodiments, the hollow fastening member 220 can be screwed and locked into the threaded blind hole 212 of the lug portion 210 to attach the pulling cable 104 to the pulling grip 102, as illustrated in FIG. 2. Alternatively, the hollow fastening member 510 can be pushed into and locked within the blind hole 502 of the lug portion 210 to attach the pulling cable 104 of the pulling grip 102, as illustrated in FIG. 5. Whether the pulling cable 104 is locked within the threaded blind hole 212 by virtue of being assembled within the hollow fastening member 220 or is locked within the blind hole 502 by virtue of being assembled within the hollow fastening member 510, the pulling cable 104 is still able to twist axially within the hollow fastening member 220, 510 as needed in response to forces experienced while being pulled through a conduit, which alleviates the potential of the conductors 114 on which the pulling grips 102 are attached from getting jammed within the conduit. From operation 608, the method 600 may proceed to operation 610, where a conductor, such as the conductor 114, or a bare wire or cable of the conductor 114 is inserted within the interior cavity 204 of the elongated body portion 202 of the pulling grip 102 of the pulling grip assembly 100 that has been assembled via operations 602-608, and the elongated body portion 202 is crimped or otherwise secured onto the bare wire or cable of the conductor 114. In addition, from operation 610, the method 600 may proceed to operation 612, where the pulling cable 104 of the pulling grip assembly 100 may be attached to a pulling rope, such as the pulling rope 116, in preparation for pulling the pulling grip assembly 100 with the conductor 114 attached through a conduit. From operation 612, the method 600 proceeds to operation 614, where the method 600 ends.

The subject matter described above is provided by way of illustration only and should not be construed as limiting. Various modifications and changes may be made to the subject matter described herein without following the example embodiments and applications illustrated and described, and without departing from the true spirit and scope of the present invention, which is encompassed in the following claims.

What is claimed is:

1. A pulling grip assembly comprising:
   a pulling grip comprising
      an elongated body portion, and
      a lug portion comprising a blind hole for receiving an assembly, wherein the blind hole comprises a neck portion and a body portion, and wherein a diameter of the neck portion is smaller than a diameter of the body portion; and
   the assembly comprising a hollow fastening member and a pulling cable retained within the hollow fastening member, wherein the hollow fastening member has a constricted diameter when the hollow fastening member is in contact with the neck portion of the blind hole and has a resting diameter when the hollow fastening member is within the body portion of the blind hole, and wherein the resting diameter of the hollow fastening member is greater than the diameter of the neck portion of the blind hole to lock the hollow fastening member within the body portion of the blind hole.

2. The pulling grip assembly of claim 1, wherein the hollow fastening member comprises a plurality of petals that extend outwardly from a center of the hollow fastening member when the hollow fastening member is in a resting state and that constrict inwardly toward the center of the hollow fastening member when the hollow fastening member is in one of a plurality of constricted states, and wherein the hollow fastening member has the resting diameter in the resting state and the constricted diameter in one of the plurality of constricted states.

3. The pulling grip assembly of claim 2, wherein the plurality of petals are constructed of a material with a high yield strength.

4. The pulling grip assembly of claim 1, further comprising at least a portion of the pulling cable retained within the hollow fastening member.

5. The pulling grip assembly of claim 4, wherein at least the portion of the pulling cable is retained within the hollow fastening member by a stop that is secured to an end of at least the portion of the pulling cable once the end of at least the portion of the pulling cable has passed through and is out of the opening defined by the hollow fastening member.

6. The pulling grip assembly of claim 5, wherein the stop comprises a shank including a ball-shaped portion that has a diameter larger than a diameter of the opening defined by the hollow fastening member.

7. The pulling grip assembly of claim 4, wherein the pulling cable is able to twist axially when at least the portion of the pulling cable is retained within the opening of the hollow fastening member.

8. A method comprising:
   retaining a pulling cable within a hollow fastening member to form an assembly of the pulling cable and the hollow fastening member; and
   locking the assembly of the pulling cable and the hollow fastening member within a blind hole of a lug portion of a pulling grip, wherein the blind hole comprises a neck portion and a body portion, wherein a diameter of the neck portion is smaller than a diameter of the body portion, wherein the hollow fastening member has a constricted diameter when the hollow fastening member is in contact with the neck portion of the blind hole and has a resting diameter when the hollow fastening member is within the body portion of the blind hole, and wherein the resting diameter of the hollow fastening member is greater than the diameter of the neck portion of the blind hole to lock the hollow fastening member within the body portion of the blind hole.

9. The method of claim 8, wherein retaining the pulling cable within the hollow fastening member to form the assembly of the pulling cable and the hollow fastening member comprises passing an end of the pulling cable through an opening defined by the hollow fastening member.

10. The method of claim 9, wherein retaining the pulling cable within the hollow fastening member to form the assembly of the pulling cable and the hollow fastening member further comprises attaching a stop to the end of the pulling cable passed through the opening defined by the hollow fastening member.

11. The method of claim 8, further comprising creating the blind hole in the lug portion of the pulling grip.

12. The method of claim 8, wherein locking the assembly of the pulling cable and the hollow fastening member within the blind hole of the lug portion of the pulling grip comprises pushing the assembly into the blind hole at least until the hollow fastening member moves back to the resting diameter to lock the assembly within the blind hole.

* * * * *